United States Patent [19]

Tomobe et al.

[11] Patent Number: 4,886,035
[45] Date of Patent: Dec. 12, 1989

[54] AIR-FUEL RATIO CONTROL METHOD FOR AN INTERNAL COMBUSTION ENGINE

[75] Inventors: Norio Tomobe; Haruo Shimamura; Kozo Suzuki; Yutaka Taniguchi; Yuji Fujiki, all of Wako, Japan

[73] Assignee: Honda Giken Kogyo Kabushiki Kaisha, Tokyo, Japan

[21] Appl. No.: 175,470

[22] Filed: Mar. 30, 1988

[30] Foreign Application Priority Data

Mar. 31, 1987 [JP] Japan .................. 62-077985
Aug. 11, 1987 [JP] Japan .................. 62-200281
Dec. 1, 1987 [JP] Japan .................. 62-304117

[51] Int. Cl.$^4$ ............................................. F02M 23/10
[52] U.S. Cl. ............................... 123/588; 123/179 G
[58] Field of Search .......... 123/179 G, 588, 589, 123/585, 179 L

[56] References Cited

U.S. PATENT DOCUMENTS

| | | | |
|---|---|---|---|
| 3,960,130 | 6/1976 | Peterson | 123/588 |
| 3,977,380 | 8/1976 | Atsumi et al. | 123/588 |
| 4,043,310 | 8/1977 | Ichimiya et al. | 123/588 |
| 4,108,127 | 8/1978 | Chapin et al. | 123/588 |
| 4,414,943 | 11/1983 | Nagase | 123/588 |
| 4,495,904 | 1/1985 | Sakaino et al. | 123/179 G |
| 4,773,378 | 9/1988 | Fujimura et al. | 123/179 L |

FOREIGN PATENT DOCUMENTS

0176446 10/1983 Japan .................. 123/585

Primary Examiner—Willis R. Wolfe
Assistant Examiner—M. Macy
Attorney, Agent, or Firm—Pollock, VandeSande & Priddy

[57] ABSTRACT

An air-fuel ratio control method which controls the amount of the intake side secondary air in accordance with either the engine temperature or both of the engine temperature and the intake air temperature upon the engine re-start under a high engine temperature, thereby avoiding enrichment of the intake air-fuel ratio even at the occurrence of the percolation phenomenon and to improve the engine-start property. Furthermore, the amount of the intake side secondary air is controlled until the start of the air-fuel ratio feedback control to accomplish improvement in the purification of the exhaust gases and in the stability of the engine speed at an idle state.

9 Claims, 10 Drawing Sheets

AIR-FUEL RATIO CONTROL METHOD FOR AN INTERNAL COMBUSTION ENGINE

BACKGROUND OF THE INVENTION

1. Field of the Invention

The present invention relates to an air-fuel ratio control method for an internal combustion engine.

2. Description of the Background Information

In a known air-fuel ratio control device as disclosed in Japanese Patent Publication No. 55-3533, for example, an exhaust gas component concentration such as an oxygen concentration in an exhaust gas is detected by an exhaust gas component concentration sensor, and an air quantity or a fuel quantity in a fuel mixture to be supplied to an internal combustion engine mounted in a vehicle is regulated according to a detection value by the exhaust gas component concentration sensor to thereby feedback control an air-fuel ratio of the supplied fuel mixture, for the purposes of purification of the exhaust gas and improvement in fuel consumption, etc.

An internal combustion engine mounted on a vehicle is sometimes restarted under a high engine temperature condition caused by prolonged cruising of the vehicle. In this case, there is a possibility that the fuel in a float chamber and a fuel passage of a carburetor is vaporized owing to the high temperature during the stoppage of the engine, and fuel bubbles operate to discharge a large amount of the fuel from a nozzle by a pumping action, which is generally called a percolation phenomenon. As a result, the air-fuel ratio of the supplied fuel mixture is enriched upon the engine-start under the high engine temperature, causing an increase in emission of unburnt components such as CO (carbon monoxide) and HC (hydrocarbon), etc.

Furthermore, when the intake air temperature is high at idling after the engine-start at a high engine temperature, the air-fuel becomes over-rich because of a decrease of the air density of the intake air as well as the generation of the fuel vapor from the carburetor. Additionally, as a replenishment efficiency in an engine combustion chamber is decreased, the air-fuel ratio is further enriched. Moreover, an air-fuel ratio correction unitary quantity by proportional-plus-integral control at idling is small, and an air-fuel ratio correction speed by a secondary air or the like is slow. Therefore, there occurs a reduction in engine speed at idling after starting at a high engine temperature as mentioned above. Since the overrichness of the air-fuel ratio continues until the vapor deposited on the inner wall of the intake pipe is completely absorbed, the emission of especially CO and HO is increased during this period of time. On the other hand, the air-fuel ratio of the supplied fuel mixture is enriched because of the percolation phenomenon thereby to cause degradation in engine-start property at restarting of the engine under a high engine temperature condition. Then, there is disclosed in Japanese Patent Laid-Open Publication No. 58-185965 an air-fuel ratio control device to improve the engine-start property at high engine temperature. In this air-fuel ratio control device, a secondary air control valve of an ON-OFF type flow regulating valve is provided in a secondary intake air supplying passage communicating an intake manifold, and the secondary air control valve is maintained open for a predetermined time (1.0–1.5 sec) at engine-restart under the high engine temperature, thus preventing the enrichment of the air-fuel ratio by supplying a secondary intake air.

However, in the air-fuel ratio control device having a linear type flow regulating valve capable of continuously changing the opening degree thereof in the secondary intake air supplying passage, the linear type flow regulating valve can control a flow quantity per unit time greater than the ON-OFF type flow regulating valve. Therefore, when the linear type flow regulating valve is maintained in its full open position at engine-restart under the high engine temperature, the air-fuel ratio of the supplied fuel mixture is rendered overlean, causing degradation in engine-start property.

Further, even when the same quantity of the secondary intake air is supplied at the same engine temperature upon engine restarting under the high engine temperature, the engine-start property is dependent upon the atmospheric temperature. Particularly, it has been found that the higher the atmospheric temperature is, the more the engine-start property is deteriorated.

OBJECTS AND SUMMARY OF THE INVENTION

Accordingly, it is a first object of the present invention to provide an air-fuel ratio control method which improves the engine-start property of an internal combustion engine under the high engine temperature condition in the internal combustion engine including a linear type flow regulating valve in a secondary intake air supplying passage.

It is a second object of the present invention to provide an air-fuel ratio control method for an internal combustion engine which improves the engine-start property at a high temperature of the engine, even when the atmospheric temperature is high.

It is a third object of the present invention to provide an air-fuel ratio control method which improves an exhaust gas purifying characteristic and stabilizes the engine operation after starting under the high engine temperature.

According to the first aspect of the present invention, there is provided an air-fuel ratio control method for an internal combustion engine having a secondary intake air supplying passage communicating with an intake pipe downstream of a throttle valve in a carburetor of the internal combustion engine and a linear type flow regulating valve provided in the secondary intake air supplying passage; which method comprises the steps of: detecting an engine temperature at starting of the internal combustion engine, controlling the opening of the flow regulating valve to a control opening degree determined correspondingly to the engine temperature when the internal combustion engine is in a hot condition where the engine temperature is greater than a predetermined temperature, and stopping the control of the flow regulating valve to the controlled opening degree when a control time corresponding to the engine temperature is elapsed.

According to the second aspect of the present invention, there is provided an air-fuel ratio control method for an internal combustion engine having a secondary intake air supplying passage communicating with an intake pipe downstream of a throttle valve in a carburetor and a flow regulating valve provided in the secondary intake air supplying passage; which method comprises the steps of: detecting an intake air temperature and an engine temperature at starting of the engine, and controlling the opening of the flow regulating valve in accordance with the intake air temperature and the engine temperature when the intake air temperature is high and the engine temperature is high at starting of the engine.

According to the third aspect of the present invention, there is provided an air-fuel ratio control method for an internal combustion engine having a secondary intake air supplying passage communicating with an intake pipe downstream of a throttle valve in a carburetor of a suction system, an exhaust gas component concentration sensor provided in an exhaust system for detecting an exhaust gas component concentration in an exhaust gas, a flow regulating valve provided in the secondary intake air supplying passage, and a control means for controlling an opening degree of the flow regulating valve according to an output signal from the exhaust gas component concentration sensor under a predetermined operational condition; which method comprises the steps of: detecting an engine temperature at starting of the engine, and continuing to open the flow regulating valve irrespective of the output signal from the exhaust gas component concentration sensor when the engine is in a hot condition where the engine temperature is greater than a predetermined temperature, until the predetermined operational conditions are satisfied.

DETAILED DESCRIPTION OF THE PREFERRED EMBODIMENT

There will now be described a preferred embodiment of the present invention with reference to the accompanying drawings.

Figure 1:
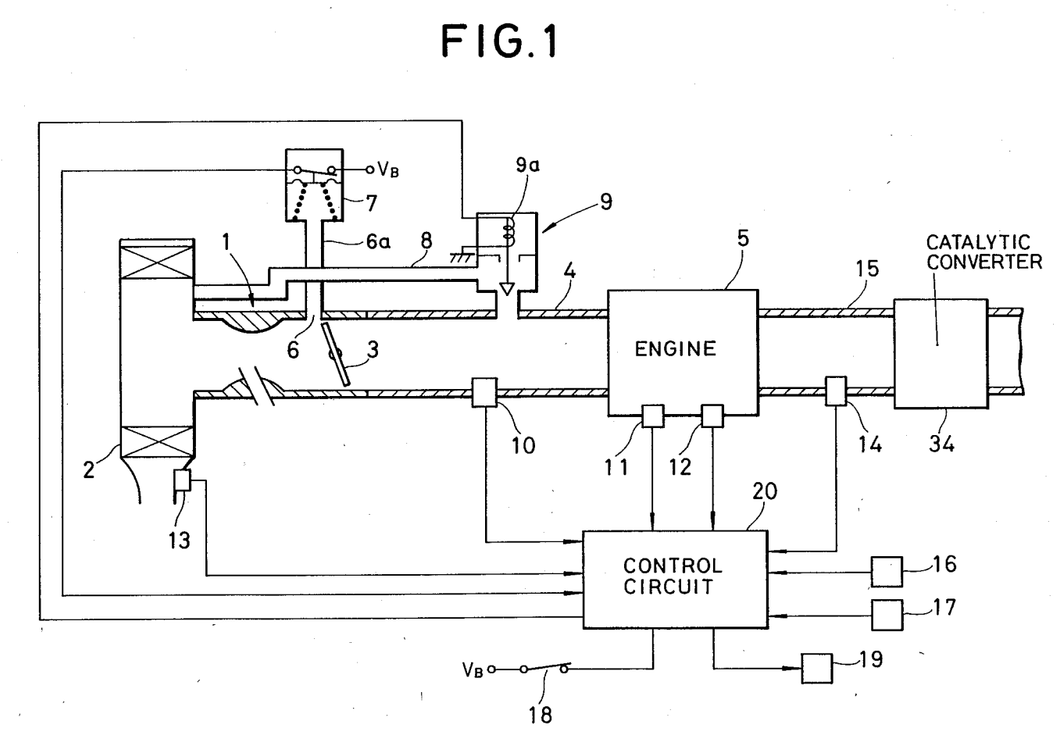
FIG. 1 is a schematic illustration of the air-fuel ratio control device to which the air-fuel ratio control method of the present invention is applied.

FIG. 1 shows an air-fuel ratio control device to which the air-fuel ratio control method of the present invention is applied. The air-fuel ratio control device is provided with a secondary intake air supplying passage 8 communicating from the vicinity of an air discharge opening of an air cleaner 2 to an intake manifold 4 downstream of a throttle valve 3 in a carburetor 1. The secondary intake air supplying passage 8 is provided with a solenoid valve 9 serving as a linear type flow regulating valve. An opening degree of the solenoid valve 9 is changed in proportion to a current value to be supplied to a solenoid 9a in the solenoid valve 9.

A vacuum detecting port 6 is formed on the inner wall surface of an intake passage in the vicinity of the throttle valve 8. When an opening angle of the throttle valve 3 is not greater than a predetermined angle, the vacuum detecting port 6 is located upstream of the throttle valve 3, while when the opening angle of the throttle valve 3 is greater than the predetermined angle, the vacuum detecting port 6 is located downstream of the throttle valve 3. A vacuum $P_C$ at the vacuum detecting port 6 is supplied through a vacuum passage 6a to a vacuum switch 7. The vacuum switch 7 is provided so as to detect a closed condition of the throttle valve 3. When the vacuum at the vacuum detecting port 6 is not greater than 30 mmHg, for example, the vacuum switch 7 is designed to go on.

An absolute pressure sensor 10 is provided in the intake manifold 4 to generate an output in a level according to an absolute pressure $P_{BA}$. A crank angle sensor 11 is provided to generate a pulse, e.g., TDC pulse, synchronous with the rotation of a crank shaft (not shown) of an internal combustion engine 5. A cooling water temperature sensor 12 is provided to generate an output in a level according to a cooling water temperature $T_W$. An intake air temperature sensor 13 is provided to generate an output voltage according to an intake air temperature $T_A$. An oxygen concentration sensor 14 serving as an exhaust gas component concentration sensor is provided in an exhaust manifold 15 of the engine 5 to generate an output voltage according to an oxygen concentration in the exhaust gas. For example, the oxygen concentration sensor 14 is a sensor of $\lambda=1$ type designed to suddenly change an output voltage at a stoichiometric air-fuel ratio. A catalytic converter 34 is provided downstream of the oxygen concentration sensor 14 in the exhaust manifold 15 to promote a reduction in harmful components in the exhaust gas. Each output from the vacuum switch 7, the absolute pressure sensor 10, the crank angle sensor 11, the water temperature sensor 12, the intake air temperature sensor 13 and the oxygen concentration sensor 14 is supplied to a control circuit 20. The control circuit 20 is further connected to a vehicle speed sensor 16 for generating an output in a level according to a vehicle speed V, an atmospheric pressure sensor 17 for generating an output according to an atmospheric pressure $P_A$, and a clutch switch 18 adapted to go off when a clutch pedal (not shown) is depressed. The vacuum switch 7 and the clutch switch 18 are adapted to generate a low level output when they are off, while when they are on, they are adapted to generate a high level output.

Figure 2:
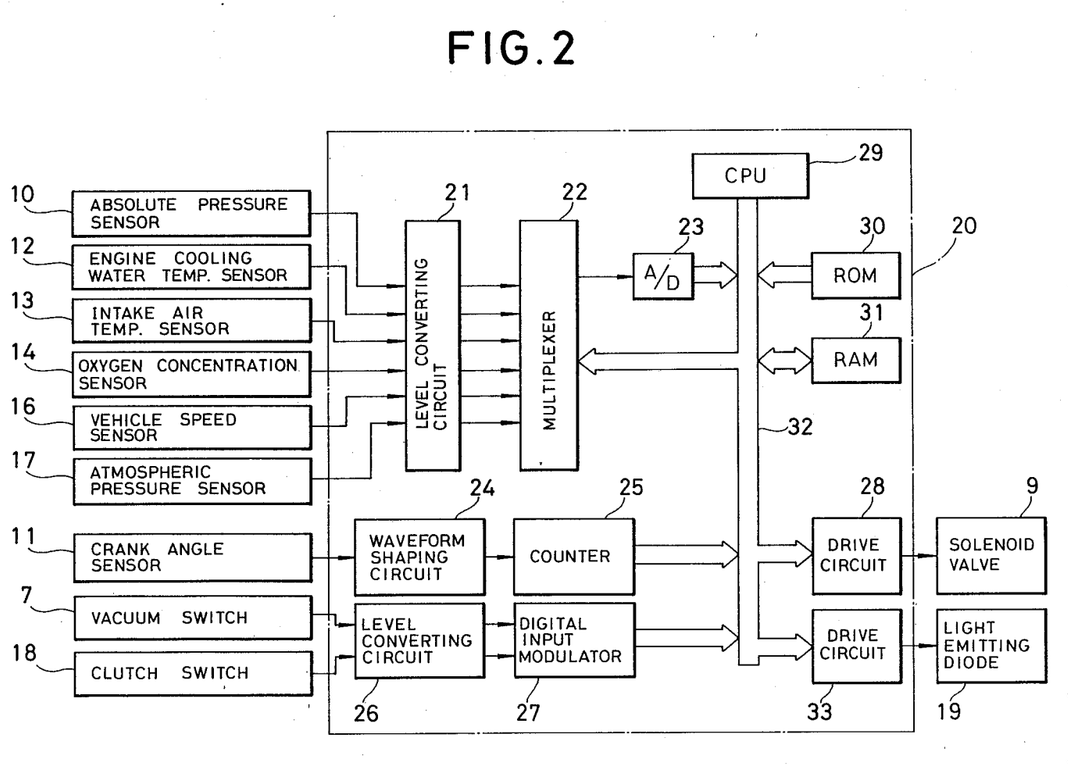
FIG. 2 is a block diagram of the control circuit in the device shown in FIG. 1.

Referring to FIG. 2, the control circuit 20 includes a level converting circuit 21 for converting a level of each output from the absolute pressure sensor 10, the water temperature sensor 12, the intake air temperature sensor 13, the oxygen concentration sensor 14, the vehicle speed sensor 16 and the atmospheric pressure sensor 17, a multiplexer 22 for selectively generating one of the sensor outputs received through the level converting circuit 21, an A/D converter 23 for converting an output signal from the multiplexer 22 to a digital signal, a waveform shaping circuit 24 for shaping a waveform of the output signal from the crank angle sensor 11, a counter 25 for measuring a pulse separation of output pulses from the waveform shaping circuit 24 by the number of clock pulses generated from a clock pulse generating circuit (not shown) and outputting data of an engine speed $N_e$, a level converting circuit 26 for converting a level of each output from the vacuum switch 7 and the clutch switch 18, a digital input modulator 27 for making the converted outputs from the level converting circuit 26 into a digital data, a driving circuit 28 opening the solenoid valve 9, a driving circuit 33 for turning on a light emitting diode 19 for alarm, a CPU (central processing circuit) 29 for conducting a digital operation according to a program, a ROM 30 for preliminarily storing various processing programs and data, and a RAM 31. The solenoid 9a of the solenoid valve 9 is connected in series with a driving transistor and a current detecting resistor (both not shown) in the driving circuit 28, and a power voltage is supplied between both ends of such a series circuit. The multiplexer 22, the A/D converter 23, the counter 25, the digital input modulator 27, the driving circuits 28 and 33, the CPU 29, the ROM 30 and the RAM 31 are connected to one another through an I/O bus 82. The CPU 29 incorporates a timer A (not shown and the RAM 31 is a non-volatile memory.

Each information of the absolute pressure $P_{BA}$ in the intake manifold 4, the cooling water temperature $T_W$, the intake air temperature $T_A$, the oxygen concentration $O_2$ in the exhaust gas, the vehicle speed V and the atmospheric pressure $P_A$ is alternatively supplied from the A/D converter 23 through the I/O bus 32 to the CPU 29, and the information indicative of the engine speed $N_e$ is supplied through the I/O bus 32 to the CPU 29. Further, the information of on-off state of the vacuum switch 7 and the clutch switch 18 is supplied from the digital input modulator 27 through the I/O bus 32 to the CPU 29. When an ignition switch (not shown) is turned on, the CPU 29 repeats to process a program to be hereinafter described according to a clock pulse, thereby calculating or setting as a data an air-fuel ratio control output value $AF_{OUT}$ indicative of a current value to be supplied to the solenoid 9a of the solenoid valve 9, and then supplying the output value $AF_{OUT}$ to the driving circuit 28. The driving circuit 28 operates to closed-loop control the current value flowing through the solenoid 9a so that the current value may become the output value $AF_{OUT}$.

Figure 3:
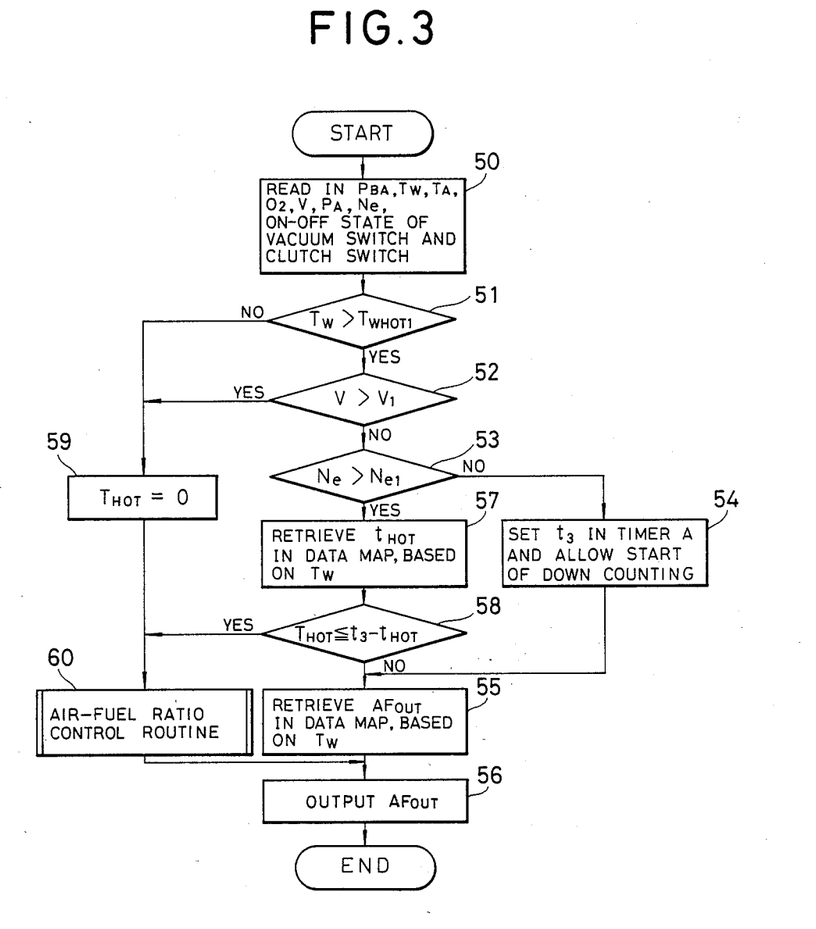
FIGS. 3 and 6 are flow charts of the operation of the CPU showing the procedure of the air-fuel ratio control method of the first aspect of the present invention.
Figure 6:
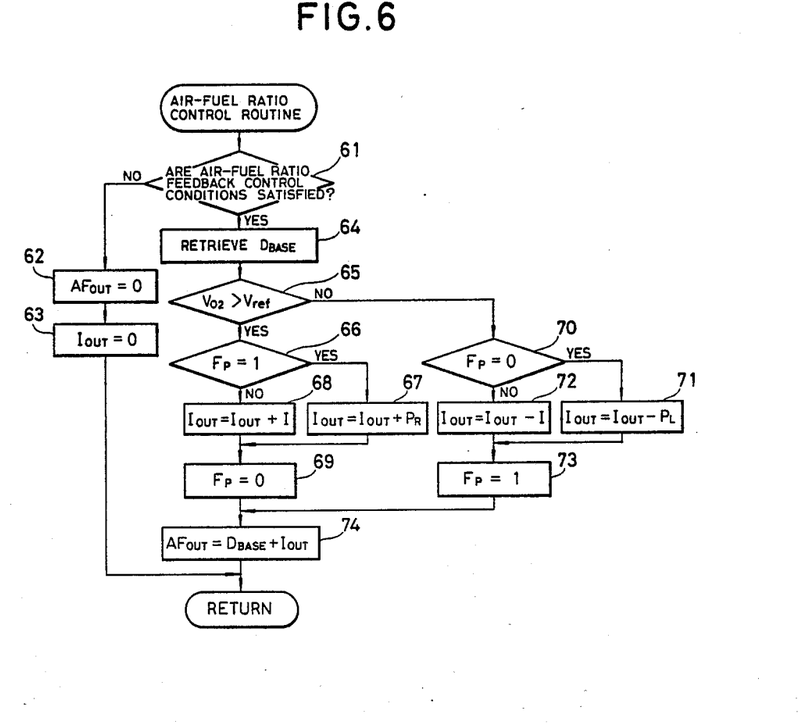

The operation of the air-fuel ratio control device as mentioned above will now be described in detail with reference to FIGS. 3 and 6 showing a flow chart of the operation of the CPU 29.

Figure 4:
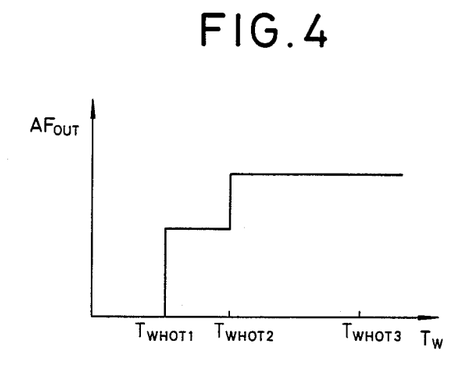
FIG. 4 is a graph of the $T_W$-$AF_{OUT}$ characteristic.

Referring first to FIG. 3, the CPU 29 reads each information of the absolute pressure $P_{BA}$, the cooling water temperature $T_W$, the intake air temperature $T_A$, the oxygen concentration $O_2$ in the exhaust gas, the vehicle speed V, the atmospheric pressure $P_A$, the engine speed $N_e$, and the on-off state of the vacuum switch 7 and the clutch switch 18 (step 50). Then, it is determined whether or not the cooling water temperature $T_W$ as a parameter indicative of an engine temperature is greater than a high engine determination temperature $T_{WHOT1}$ (95° C., for example) (step 51). If $T_W > T_{WHOT1}$, it is determined that the engine is in a hot condition, and it is then determined whether or not the vehicle speed V is greater than a slow running determination speed $V_1$ (17 Km/h, for example) (step 52). If $V \leq V_1$, it is determined that the vehicle is in a low vehicle speed condition including a prestarting condition of the vehicle, and it is then determined whether or not the engine speed $N_e$ is greater than a cranking speed $N_{e1}$ (400 rpm, for example) (step 53). If $N_e \leq N_{e1}$, it is determined that the engine has not yet started. Therefore, a predetermined time $t_3$ (2.5 sec, for example) is set in the timer A to start down-counting (step 54), and the air-fuel ratio control output value $AF_{OUT}$ is retrieved from an $AF_{OUT}$ data map (step 55). The air fuel ratio control output value $AF_{OUT}$ is indicative of current valve to be supplied to the solenoid 9a of the solenoid value 9, and the $AF_{OUT}$ data map having a $T_W$-$AF_{OUT}$ characteristic as shown in FIG. 4 is preliminarily stored in the ROM 30. Therefore, the CPU 29 retrieves the air-fuel ratio control output value $AF_{OUT}$ corresponding to the cooling water temperature $T_W$ from the $AF_{OUT}$ data map. In the $T_W$-$AF_{OUT}$ characteristic, $T_{WHOT2}$ is 100° C. for example, and $T_{WHOT3}$ is 110° C., for example. After retrieving and setting the air-fuel ratio control output value $AF_{OUT}$, the output value $AF_{OUT}$ is output to the driving circuit 28 (step 56). The driving circuit 28 drives to open the solenoid valve 9, and the opening degree of the solenoid valve 9 is varied in proportion to the current value flowing through the solenoid 9a. Accordingly, a secondary intake air in an amount corresponding to the output value $AF_{OUT}$ is supplied into the intake manifold 4 at engine starting under the high engine temperature.

Figure 5:
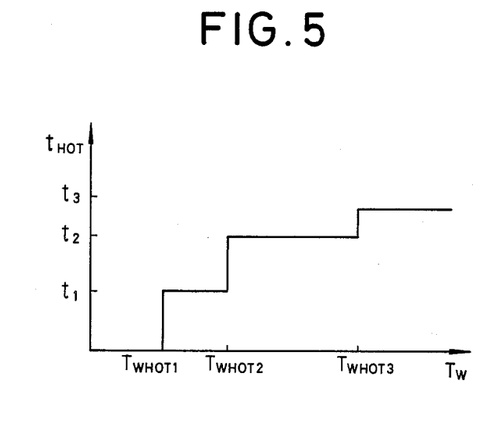
FIG. 5 is a graph of the $T_W$-$t_{HOT}$ characteristic.

If $N_e > N_{e1}$ in step 53, it is determined that the engine starting operation has ended, a control time $t_{HOT}$ for supplying the secondary intake air from the end of the starting operation is retrieved from the $t_{HOT}$ data map (step 57). As the ROM 30 preliminarily stores a $t_{HOT}$ data map having a $T_W$-$t_{HOT}$ characteristic as shown in FIG. 5, the CPU 29 retrieves the control time $t_{HOT}$ corresponding to the cooling water temperature $T_W$ from the $t_{HOT}$ data map. That is, the control time $t_{HOT}$ is set to a predetermined time $t_1$ (1.0 sec, for example) in the range of $T_{WHOT} < T_W \leq T_{WHOT2}$, and the control time $t_{HOT}$ is set to a predetermined $t_2$ (2.0 sec, for example; $t_1 < t_2 < t_3$) in the range of $T_{WHOT2} < T_W \leq T_{WHOT3}$. Further, the control time $t_{HOT}$ is set to a predetermined time $t_3$ in the range of $T_W > T_{WHOT3}$.

After retrieving the control time $t_{HOT}$, it is determined whether or not a measured value $T_{HOT}$ by the timer A has reached the difference $t_3 - t_{HOT}$ between the predetermined time $t_3$ and the control time $t_{HOT}$ (step 58). If $T_{HOT} > t_3 - t_{HOT}$, it is determined that the control time $t_{HOT}$ has not elapsed after starting of the engine, and the program then proceeds to step 55 where the secondary intake air continues to be supplied within the control time $t_{HOT}$. If $T_{HOT} \leq t_3 - t_{HOT}$, it is determined that the control time $t_{HOT}$ or more has elapsed after starting of the engine, and the program then proceeds to an air-fuel ratio control routine (step 60). Accordingly, during only the control time $t_{HOT}$ counted from the end of the engine starting operation, the secondary intake air in an amount corresponding to the air-fuel ratio control output value $AF_{OUT}$ retrieved in step 55 is supplied into the intake manifold 4.

If $T_W \leq T_{WHOT1}$ in step 51, it is determined that the engine has not been started under its hot condition. Further, if $V > V_1$ in step 52, it is determined that the vehicle has been started to run and the vehicle speed has exceeded the low vehicle speed. In both the cases, it is not necessary to supply the secondary intake air at starting of the engine. Therefore, the measured value $T_{HOT}$ by the timer A is set to 0 (step 59), and the program then proceeds to the air-fuel ratio control routine (step 60).

Referring next to FIG. 6 which shows the air-fuel ratio control routine, it is determined whether or not air-fuel ratio feedback control conditions have been satisfied according to each information as read (step 61). For example, at high engine speed, at high intake air temperature, at low intake air temperature, or at deceleration from high vehicle speed, it is determined that the air-fuel ratio feedback control conditions are not satisfied, and the air-fuel ratio control output value $AF_{OUT}$ is set to 0 so as to to open-loop control the air-fuel ratio (step 62). Further, an air-fuel ratio correction value $I_{OUT}$ is set to 0 step 63). On the other hand, when the air-fuel ratio feedback control conditions are satisfied, an air-fuel ratio control base value $D_{BASE}$ is retrieved (step 64) As the ROM 30 preliminarily stores the base value DBASE to be defined from the absolute pressure $P_{BA}$ and the engine speed $N_e$ as a $D_{BASE}$ data map, the CPU 29 retrieves the base value $D_{BASE}$ corresponding to the absolute pressure $P_{BA}$ and the engine speed $N_e$ as read from the $D_{BASE}$ data map. In the $D_{BASE}$ data map, the base value $D_{BASE}$ between grids is calculated by interpolation.

After setting the base value $D_{BASE}$, it is determined whether or not an output voltage $V_{O2}$ of the oxygen concentration sensor 14 is greater than a reference voltage $V_{ref}$(0.5 V, for example) (step 65). If $V_{O2} > V_{ref}$, it is determined that the air-fuel ratio of a supplied fuel mixture is richer than a stoichiometric air-fuel ratio, and it is then determined whether or not a flag $F_P$ is equal to 1 (step 66). If $F_P = 1$, it is determined that the air-fuel ratio has been just inverted from a lean state to a rich state with respect to the stoichiometric air-fuel ratio. Therefore, a proportional quantity $P_R (= \alpha_R \times N_e \times P_{BA}$; $\alpha_R$ is a constant) is added to the air-fuel ratio correction value $I_{OUT}$, and the calculated value is set to a new air-fuel ratio correction value $I_{OUT}$ (step 67). If $F_P = 0$, it is determined that the air-fuel ratio continues to be in a rich state. Therefore, an integral quantity I ($= K \times N_e \times PBA$; K is a constant) is added to the air-fuel ratio correction value $I_{OUT}$, and the calculated value is set to a new air-fuel ratio correction value $I_{OUT}$ (step 68). After executing the step 67 or 68, the flag $F_P$ is reset to 0 so as to indicate that the air-fuel ratio has been in a rich state in this processing cycle (step 69).

On the other hand, if $V_{O2} \leq V_{ref}$, it is determined that the air-fuel ratio of the supplied fuel mixture is in a lean state, and it is then determined whether or not the flag $F_P$ is equal to 0 (step 70). If $F_P = 0$, it is determined that the air-fuel ratio has been just inverted from the rich state to the lean state with respect to the stoichiometric air-fuel ratio. Therefore, a proportional quantity $P_L$ ($= \alpha_L \times N_e \times P_{BA}$; $\alpha_L$ is a constant; $\alpha_R \neq \alpha_L$) is subtracted from the air-fuel ratio correction value $I_{OUT}$, and the calculated value is set to a new air-fuel ratio correction value $I_{OUT}$ (step 71). If $F_p = 1$, it is determined that the air-fuel ratio continues to be in a lean state. Therefore, the integral quantity I is subtracted from the air-fuel ratio correction value $I_{OUT}$, and the calculated value is set to a new air-fuel ratio correction value $I_{OUT}$ (step 72). After executing the step 71 or 72, the flag $F_P$ is reset to 1 so as to indicate that the air-fuel ratio has been in a lean state in this processing cycle (step 73). After executing the step 69 or 73, the calculated air-fuel ratio correction value $I_{OUT}$ is added to the air-fuel ratio control base value $D_{BASE}$ to thereby calculate the air-fuel ratio control output value $AF_{OUT}$ (step 74). Then, the calculated output value $AF_{OUT}$ is output to the driving circuit 28 (step 56). Thus, the secondary intake air in an amount corresponding to the output value $AF_{OUT}$ is supplied into the intake manifold 4 to feedback control the air-fuel ratio of the supplied fuel mixture to the stoichiometric air-fuel ratio. Further, in the open-loop control, the output value $AF_{OUT}$ is set to 0 irrespective of the output from the oxygen concentration sensor 14. Accordingly the solenoid valve 9 is closed to stop the supply of the secondary intake air.

Although the above-mentioned preferred embodiment is designed to stop the control of the opening degree of the linear type flow regulating valve when the time from the end of the engine starting operation corresponding to the engine temperature is elapsed, the present invention is not limited to this embodiment. For example, the control of the opening degree of the linear type flow regulating valve may be stopped when the time from the start of the engine starting operation corresponding to the engine temperature is elapsed.

Referring to the flow chart of FIG. 7, another control method according to a second embodiment of the present invention will be explained hereinafter.

Figure 7:
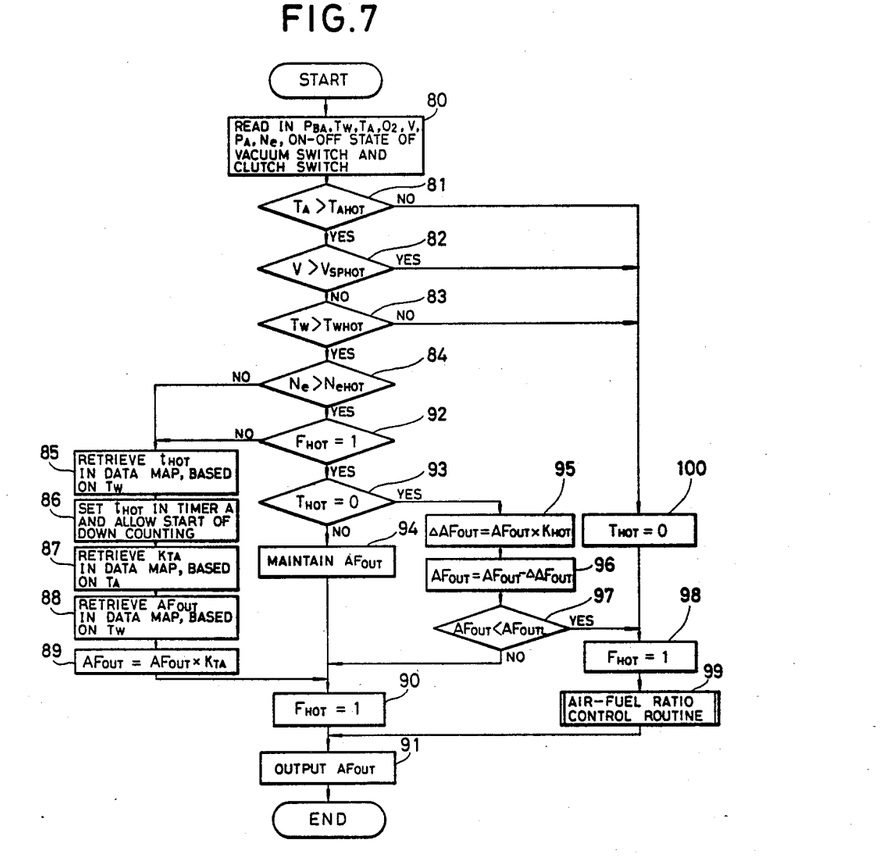
FIG. 7 is flow chart of the operation of the CPU showing the procedure of the air-fuel ratio control method of the second aspect of the present invention.
Figure 8:
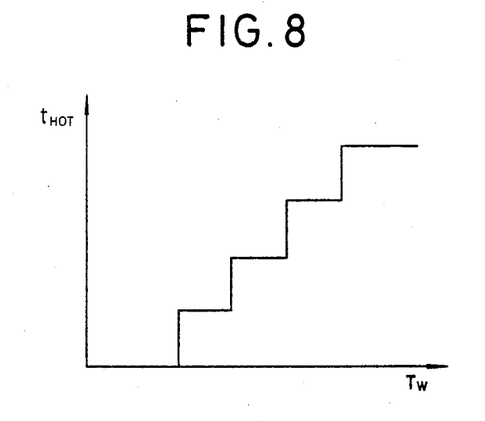
FIG. 8 is a graph of the $T_W$-$t_{HOT}$ characteristic.
Figure 9:
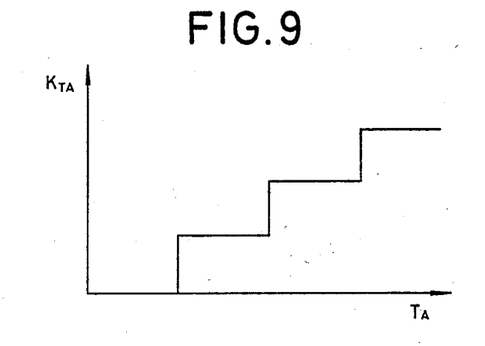
FIG. 9 is a graph of the $T_W$-$K_{TA}$ characteristic.
Figure 10:
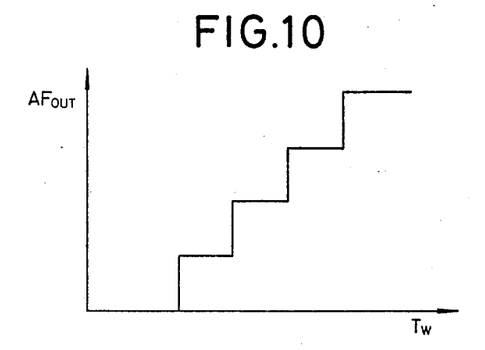
FIG. 10 is a graph of the $T_W$-$AF_{OUT}$ characteristic.

As shown in FIG. 7, the CPU 29 reads each information of the absolute pressure $P_{BA}$, the cooling water temperature $T_W$, the intake air temperature $T_A$, the oxygen concentration $O_2$ in the exhaust gas, the vehicle speed V, the atmospheric pressure $P_A$, the engine speed $N_e$, and the on-off state of the vacuum switch 7 and the clutch switch 18 (step 80). Then, it is determined whether or not the intake air temperature $T_A$ as read is greater than a hot intake air determination temperature $T_{AHOT}$ (20° C., for example) (step 81). Further, it is determined whether or not the vehicle speed V is greater than a slow running determination speed $V_{SPHOT}$ (12.5 Miles/h, for example) (step 82). Further, it is determined whether or not the cooling water temperature $T_W$ as a parameter indicative of an engine temperature is greater than a high engine determination temperature $T_{WHOT}$ (70° C., for example) (step 83). If $T_A > T_{AHOT}$, it is determined that the intake air temperature is high. If $V \leq V_{SPHOT}$, it is determined that the vehicle is in a pre-starting condition or in a low vehicle speed condition. If $T_W > T_{WHOT}$, it is determined that the engine temperature is high. If these conditions are all satisfied, it is then determined whether or not engine speed $N_e$ is greater than a cranking speed $N_{eHOT}$ (400 rpm, for example) (step 84). If $N_e N_{eHOT}$, it is determined that the engine 5 has not been completely started. Then, a control time $t_{HOT}$ corresponding to the cooling water temperature $T_W$ is retrieved from a $t_{HOT}$ data map (step 85), and the retrieved control time $t_{HOT}$ is set in the timer A to start down-counting (step 86). As the ROM 30 preliminarily stores the $t_{HOT}$ data map having a $T_W - t_{HOT}$ characteristic as shown in FIG. 8, the CPU 29 retrieves the control time $t_{HOT}$ corresponding to the cooling water temperature $T_W$, and sets the same in the timer A. Then, an intake air temperature correction factor $K_{TA}$ is retrieved from a $K_{TA}$ data map (step 87), and the air-fuel ratio control output value $AF_{OUT}$ is retrieved from an $AF_{OUT}$ data map (step 88). As the ROM 30 preliminarily stores the $K_{TA}$ data map having a $T_A - K_{TA}$ characteristic as shown in FIG. 9, the CPU 29 retrieves the intake air temperature correction factor $K_{TA}$ corresponding to the intake air temperature $T_A$ from the $K_{TA}$ data map. Further, as the air-fuel ratio control output value $AF_{OUT}$ is indicative of a current value to be supplied to the solenoid 9a of the solenoid valve 9, and the ROM 30 preliminarily stores the $AF_{OUT}$ data map having a $T_W - AF_{OUT}$ characteristic as shown in FIG. 10, the CPU 29 retrieves the air-fuel ratio control output value $AF_{OUT}$ corresponding to the cooling water temperature $T_W$ from the $AF_{OUT}$ data map. After retrieving the intake air temperature correction factor $K_{TA}$ and the air-fuel ratio control output value $AF_{OUT}$, the intake air temperature correction factor $K_{TA}$ is multiplied by the air-fuel ratio control output value $AF_{OUT}$ to calculate a present air-fuel ratio control output value $AF_{OUT}$ (step 89), and a flag $F_{HOT}$ is set to 1 (step 90) to output the air-fuel ratio control output value $AF_{OUT}$ to the driving circuit 28 (step 91).

On the other hand, if $N_e > N_{eHOT}$ in step 84, it is determined that the engine 5 has been completely started, and it is then determined whether or not the flag $F_{OUT}$ is equal to 1 (step 92). The flag $F_{OUT}$ is initialized to 0 by turning on an ignition switch. Therefore, if $F_{HOT} = 0$, it is determined that the counting operation of the timer A is not conducted, and that the initialized value of the air-fuel ratio control value $AF_{OUT}$ is not calculated at starting under the high engine temperature. Then, the program proceeds to step 85. If $F_{HOT} = 1$, it is determined whether or not a measured value $T_{HOT}$ by the timer A has reached 0 (step 93). If $T_{HOT} > 0$, it is determined that the control time $t_{HOT}$ has not elapsed since $N_e > N_{eHOT}$ was effected. Then, the air-fuel ratio control value $AF_{OUT}$ calculated in step 89 is maintained (step 94), and the program proceeds to step 90.

If the control time $t_{HOT}$ has elapsed after the engine speed $N_e$ becomes greater than the cranking speed $N_{eHOT}$, and as a result, $T_{HOT} = 0$ is effective, a factor $K_{HOT}$ ($K_{HOT} < 1.0$; $K_{HOT} = 0.1$, for example) is multiplied by the air-fuel ratio control output value $AF_{OUT}$ to calculate a variation $\Delta AF_{OUT}$ (step 95). Then, the variation $\Delta AF_{OUT}$ is subtracted from the air-fuel ratio control output value $AF_{OUT}$ (step 96). Then, it is determined whether or not the calculated air-fuel ratio control output value $AF_{OUT}$ is smaller than a lower limit $AF_{OUTL}$ (step 97). The lower limit $AF_{OUTL}$ is a lower limit permitting the solenoid valve 9 to be opened. If $AF_{OUT} \geq AF_{OUTL}$, the program proceeds to steps 90 and 91 where the air-fuel ratio control output value $AF_{OUT}$ is output to the driving circuit 28. If $AF_{OUT} < AF_{OUTL}$, the flag $F_{HOT}$ is set to 1 (step 98), and an air-fuel ratio control routine to be hereinafter described is executed (step 99).

Accordingly, the secondary intake air in an amount corresponding to the air-fuel ratio control output value $AF_{OUT}$ calculated in step 89 is supplied to the intake manifold 4 for the control time $t_{HOT}$ from the timing when the engine speed $N_e$ becomes the cranking speed $N_{eHOT}$. After the control time $t_{HOT}$ is elapsed, the air-fuel ratio control output value $AF_{OUT}$ is gradually decreased until it reaches the lower limit $AF_{OUTL}$. Accordingly, the quantity of the secondary intake air to be supplied is gradually decreased.

If $T_A \leq T_{AHOT}$ in step 81, it is determined that the intake air temperature is not high. Further, if $V > V_{SPHOT}$ in step 82, it is determined that the vehicle starts running and the vehicle speed exceeds the low vehicle speed. If $T_W \leq T_{WHOT}$ in step 83, it is determined that the engine is not started under the high engine temperature condition. In these cases, it is not necessary to supply the secondary intake air at starting of the engine, and therefore the measured value $T_{HOT}$ by the timer A is set to 0 (step 100). Then, the program proceeds to step 98.

Referring to the flow chart of FIGS. 11 and 12, a still further control method according to a third embodiment of the present invention will be explained hereinafter.

Figure 11:
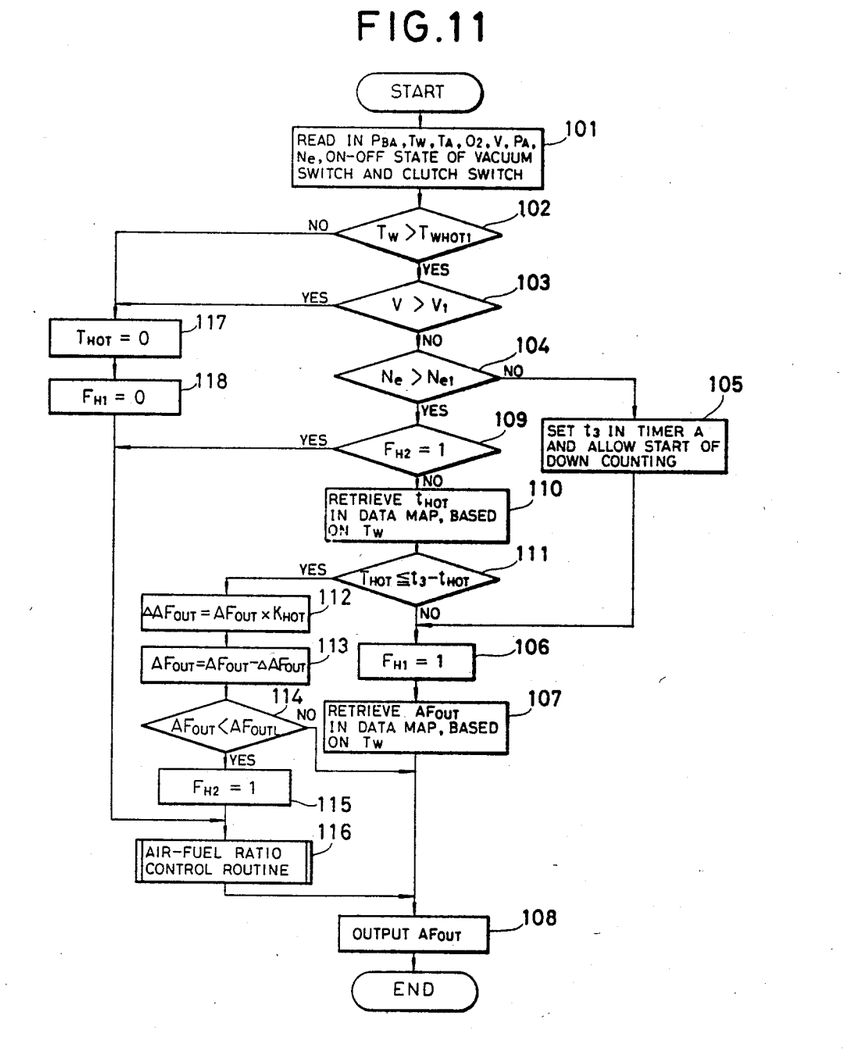
FIGS. 11 and 12 are flow charts of the operation of the CPU showing the procedure of the air-fuel ratio control method of the third aspect of the present invention.

As shown FIG. 11, the CPU 29 reads each information of the absolute pressure $P_{BA}$, the cooling water temperature $T_W$, the intake air temperature $T_A$, the oxygen concentration $O_2$ in the exhaust gas, the vehicle speed V, the atmospheric pressure $P_A$, the engine speed $N_e$, and the on-off state of the vacuum switch 7 and the clutch switch 18 (step 101). Then, it is determined whether or not the cooling water temperature $T_W$ as a parameter indicative of an engine temperature is greater than a high engine determination temperature $T_{WHOT1}$ (95° C., for example) (step 102). If $T_W > T_{WHOT1}$, it is determined that the engine is in a hot condition, and it is then determined whether or not the vehicle speed V is greater than a slow running determination speed $V_1$ (17 Km/h, for example) (step 103). If $V_{23}$ $v_1$, it is determined that the vehicle is in a low vehicle speed condition including a prestarting condition of the vehicle, and it is then determined whether or not the engine speed $N_e$ is greater than a cranking speed $N_{e1}$ (400 rpm, for example) (step 104). If $N_e \leq N_{e1}$, it is determined that the engine has not yet started. Therefore, a predetermined time $t_3$ (2.5 sec, for example) is set in the timer A to start down-counting (step 105), and a flag $F_{H1}$ is set to 1 (step 106), and the air-fuel ratio control output value $AF_{OUT}$ is retrieved from an $AF_{OUT}$ data map (step 107). The $AF_{OUT}$ data map having a $T_W - AF_{OUT}$ characteristic as shown in FIG. 4 is preliminarily stored in the ROM 30. After retrieving and setting the air-fuel ratio control output value $AF_{OUT}$, the output value $AF_{OUT}$ is output to the driving circuit 28 (step 108). The driving circuit 28 drives to open the solenoid valve 9, and the opening degree of the solenoid valve 9 is varied in proportion to the current value flowing through the solenoid 9a. Accordingly, a secondary intake air in an amount corresponding to the output vague $AF_{OUT}$ is supplied into the intake manifold 4 at the engine starting under the high engine temperature.

If $N_e > N_{e1}$ in step 104, it is determined that the engine starting operation has ended, and it is then determined whether or not a flag $F_{H2}$ is equal to 1 (step 109). The flag $F_{H2}$ is reset to 0 when the ignition switch is turned on. If $F_{H2} = 0$, a control time $t_{HOT}$ for supplying the secondary intake air from the end of the starting operation is retrieved from the $t_{HOT}$ data map (step 110). As the ROM 30 preliminarily stores a $t_{HOT}$ data map having a $T_W - t_{HOT}$ characteristic as shown in FIG. 5, the CPU 29 retrieves the control time $t_{HOT}$ corresponding to the cooling water temperature $T_W$ from the $t_{HOT}$ data map.

After retrieving the control time $t_{HOT}$, it is determined whether or not a measured value $T_{HOT}$ by the timer A has reached the difference $t_3 - t_{HOT}$ between the predetermined time $t_3$ and the control time $t_{HOT}$ (step 111). If $T_{HOT} > t_3 - t_{HOT}$, it is determined that the control time $t_{HOT}$ has not been elapsed after starting of the engine, and the program then proceeds through step 106 to step 107 where the secondary intake air continues to be supplied within the control time $t_{HOT}$. If $T_{HOT} \leq t_3 - t_{HOT}$, it is determined that the control time $t_{HOT}$ or more has been elapsed after starting of the engine, and a factor $K_{HOT}$ ($K_{HOT} < 1.0$; $K_{HOT} = 0.1$, for example) is multiplied by the air-fuel ratio control output value $AF_{OUT}$ to calculate a variation $\Delta AF_{OUT}$ (step 112). Then, the variation $\Delta AF_{OUT}$ is subtracted from the air-fuel ratio control output value $AF_{OUT}$ to calculate a present air-fuel ratio control output value $AF_{OUT}$ (step 113). Then, it is determined whether or not the calculated air-fuel ratio control output value $AF_{OUT}$ is smaller than a lower limit $AF_{OUTL}$ (step 114). The lower limit $AF_{OUTL}$ is an air-fuel ratio control base value $D_{BASE}$, for example. If $AF_{OUT} \geq AF_{OUTL}$, the program proceeds to step 108 where the air-fuel ratio control output value $AF_{OUT}$ is output to the driving circuit 28. If $AF_{OUT} < AF_{OUTL}$, the flag $F_{H2}$ is set to 1 (step 115), and the program then proceeds to an air-fuel ratio control routine (step 116). In the next processing of this routine, if $F_{H2} = 1$ is determined in step 109, the program proceeds directly to the air-fuel ratio control routine. Accordingly, during only the control time $t_{HOT}$ counted from the end of the engine starting operation, the secondary intake air in an amount corresponding to the air-fuel ratio control output value $AF_{OUT}$ retrieved in step 107 is supplied into the intake manifold 4. After the control time $t_{HOT}$ is elapsed, the air-fuel ratio control output value $AF_{OUT}$ is gradually decreased down to the lower limit $AF_{OUTL}$, and accordingly the quantity of the secondary intake air to be supplied is gradually decreased.

If $T_W \leq T_{WHOT1}$ in step 102, it is determined that the engine has not been started under its hot condition. Further, if $V > V_1$ in step 103, it is determined that the vehicle has been started to run and the vehicle speed has exceeded the low vehicle speed. In both the cases, it is not necessary to supply the secondary intake air at starting of the engine. Therefore, the measured value $T_{HOT}$ by the timer A is set to 0 (step 117), and the flag $F_{H1}$ is reset to 0 (step 118). Then, the program proceeds to step 116 to execute the air-fuel ratio control routine.

Figure 12:
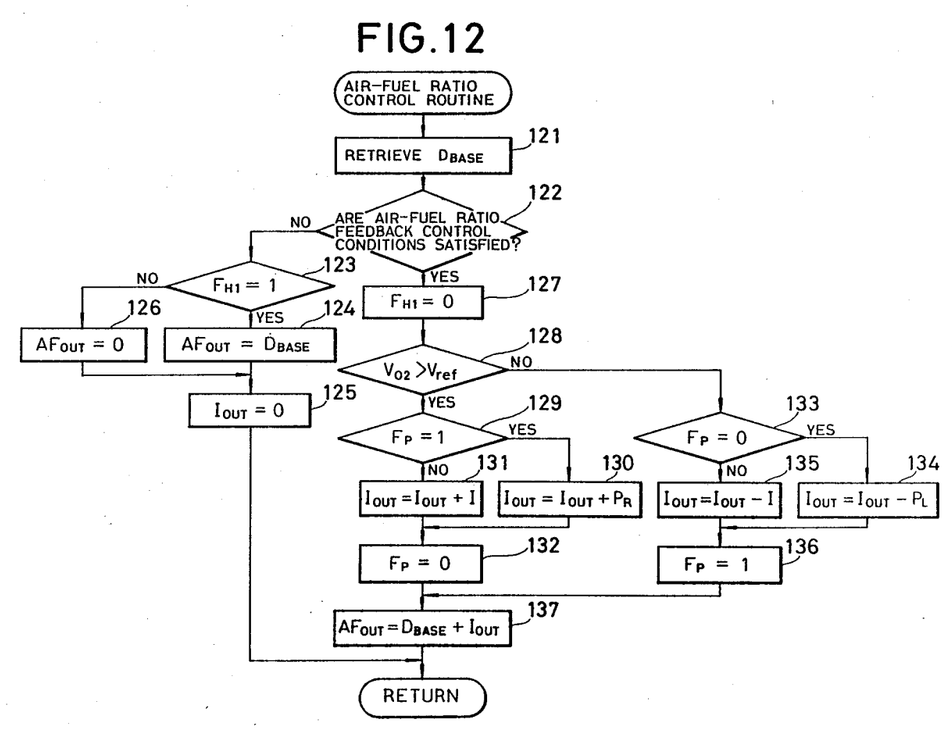

Referring to FIG. 12 which shows the air-fuel ratio control routine, the air-fuel ratio control base value $D_{BASE}$ is first retrieved (step 121). After setting the base value $D_{BASE}$, it is determined whether or not air-fuel ratio feedback control conditions have been satisfied according to each information as read (step 122). For example, at high engine speed, at low intake air temperature, or at deceleration from high vehicle speed it is determined that the air-fuel ratio feedback control conditions are not satisfied, and that an air-fuel ratio open-loop control should be carried out. If the air-fuel ratio feedback control conditions are not satisfied, it is determined whether or not the flag $F_{H1}$ is equal to 1 (step 123). Since, if $F_{H1} = 1$, it can be determined that the control operation remains at a state after the detection of $AF_{OUT} < AF_{OUTL}$ before the start of the air-fuel ratio feedback control. The air-fuel ratio control output value $AF_{OUT}$ is equalized to the base value $D_{BASE}$ retrieved in step 121 (step 124), and the air-fuel ratio correction value $I_{OUT}$ is equalized to 0 (step 125). On the other hand, if $F_{H1} = 0$, it is indicated that the air-fuel ratio feedback control conditions have not been satisfied after starting of the air-fuel ratio feedback control when the engine is started at high engine temperature, while it is indicated that the air-fuel ratio feedback control conditions are not merely satisfied when the engine is started under any condition other than the high engine temperature condition. Accordingly, if $F_{H1} = 0$, the air-fuel ratio control output value $AF_{OUT}$ is equalized to 0 (step 126), and then the program proceeds to step 125.

If the air-fuel ratio feedback control conditions are satisfied in step 122, the flag $F_{H1}$ is reset to 0 (step 127), and it is then determined whether or not an output voltage $V_{O2}$ of the oxygen concentration sensor 14 is greater than a reference voltage $V_{ref}$ (0.5 V, for example) (step 128).

The operation represented by step 129 through step 137 is the same as that represented by step 66 through step 74 shown in FIG. 6 and therefor no explanation is made for the operation by the steps 129 through 137.

Figure 13:
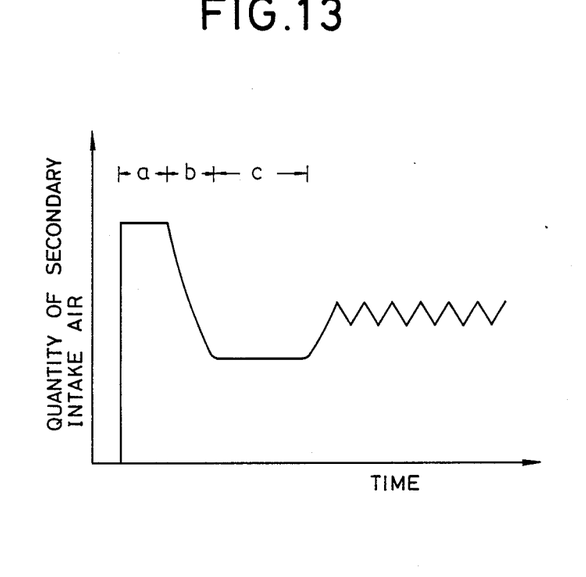
FIG. 13 is a graph showing a change in quantity of the secondary intake air to be supplied at starting under the high engine temperature according to the air-fuel ratio control method of the third aspect of the present invention.

FIG. 13 shows a change in quantity of the secondary intake air to be supplied at starting of the engine under a high engine temperature according to the air-fuel ratio control method of the third aspect of the present invention. When the engine 5 is in a hot condition where $T_W > T_{WHOT1}$ is effective at starting of the engine by turning on the ignition switch, the secondary intake air is supplied during the period a by the output value $AF_{OUT}$ corresponding to the cooling water temperature $T_W$. Even after the engine speed $N_e$ exceeds the cranking speed $N_{e1}$ to end the engine starting operation, the period a is continued, and until the time $t_{HOT}$ corresponding to the cooling water temperature $T_W$ is elapsed, the secondary intake air is supplied by the output value $AF_{OUT}$ corresponding to the cooling water temperature $T_W$. When the time $t_{HOT}$ is elapsed to end the period a, the output value $AF_{OUT}$ is gradually reduced, and until the output value $AF_{OUT}$ reaches the lower limit $AF_{OUTL}$, the quantity of the secondary intake air to be supplied is gradually decreased during the period b. After the end of the period b, the output value $AF_{OUT}$ is equalized to the base value $D_{BASE}$, and therefore the secondary intake air continues to be supplied. During the period c, the quantity of the secondary intake air to be supplied is maintained substantially constant. Accordingly, the air-fuel ratio of the supplied fuel mixture is made lean, and is controlled to range from the stoichiometric air-fuel ratio (14.7) which can stabilize the engine speed at idling to 13.0. When the air-fuel ratio feedback control conditions are satisfied, the period c is ended. Thereafter, the air-fuel ratio correction value $I_{OUT}$ is increased and decreased according to the output signal from the oxygen concentration sensor 14, and the output value $AF_{OUT}$ is set to $I_{OUT} + D_{BASE}$. Accordingly the quantity of the secondary intake air to be supplied is increased and decreased in such a manner that the air-fuel ratio of the supplied fuel mixture follows the stoichiometric air-fuel ratio.

Although the output value $AF_{OUT}$ is equalized to the base value $D_{BASE}$ in step 124 if $F_{H1} = 1$ in step 123 in the above-mentioned embodiment, the present invention is not limited to the above and the output value $AF_{OUT}$ may be equalized to a suitable value irrespective of an engine load.

As described above, according to the air-fuel ratio control method for the internal combustion engine of the first aspect of the present invention, the opening degree of the linear type flow regulating valve provided in the secondary intake air supplying passage is controlled to a controlled opening degree corresponding to an engine temperature at restarting of the engine under its hot condition. Accordingly, a proper quantity of a secondary intake air is supplied, thereby preventing the enrichment of the air-fuel ratio due to the percolation phenomenon and improving the engine-start property. Furthermore, the control of the linear type flow regulating valve to the controlled opening degree is stopped during the time corresponding to the engine temperature. Accordingly, the overleanness of the air-fuel ratio may be avoided to thereby prevent the complete explosion stall after starting of the engine.

According to the air-fuel ratio control method for the internal combustion engine of the second aspect of the present invention, as the opening degree of the flow regulating valve is controlled according to an intake air temperature and an engine temperature at engine starting under the high engine temperature, the secondary intake takes in air in an amount corresponding to a vaporized amount of fuel in a float chamber and a fuel passage of a carburetor. Accordingly, the enrichment of the air-fuel ratio at starting under the high engine temperature may be prevented to thereby improve the engine-start property.

According to the air-fuel ratio control method for the internal combustion engine of the third aspect of the present invention, until the air-fuel ratio feedback control conditions are satisfied at engine starting of the high engine temperature, the flow regulating valve is controlled to be opened irrespective of the output signal from the exhaust gas component concentration sensor Therefore, the overrichness of the air-fuel ratio due to the percolation phenomenon may be prevented to thereby reduce the emission of the unburnt components such as CO and HO to be exhausted from the engine just after starting of the engine at high temperature. Furthermore, it is possible to stabilize the engine speed during the period from just after starting under the high engine temperature to the start of the air-fuel ratio feedback control at idling.

Furthermore, as mentioned in the preferred embodiment, the engine-start property of the engine may be ensured by controlling the opening degree of the flow regulating valve to an opening degree corresponding to the engine temperature for the control time corresponding to the engine temperature. Moreover, the supply of the secondary intake air in response to a change in engine load may be carried out for the period of time from just after the starting under the high engine temperature to the start of the air-fuel ratio feedback control at idling to thereby stabilize the engine speed more by controlling the opening degree of the flow regulating valve to an opening degree corresponding to the engine load.

What is claimed is:

1. In an air-fuel ratio control method for an internal combustion engine having a secondary intake air supplying passage communicating with an intake pipe downstream of a throttle valve in a carburetor of said internal combustion engine and a linear type flow regulating valve provided in said secondary intake air supplying passage; the improvement comprising the steps of:
    detecting an engine temperature at starting of said internal combustion engine;
    initiating to control said flow regulating valve to a controlled opening degree set correspondingly to said engine temperature when the detected engine temperature is greater than a predetermined temperature; and
    stopping the control of said flow regulating valve to said controlled opening degree when a control time period corresponding to the detected engine temperature is elapsed from the starting of said engine.

2. The air-fuel ratio control method as defined in claim 1, wherein the higher the detected engine temperature is, the greater said controlled opening degree is set and the longer said control time is set in controlling the opening degree of said flow regulating valve corresponding to the detected engine temperature.

3. In air-fuel ratio control method for an internal combustion engine having a secondary intake air supplying passage communicating with an intake pipe downstream of a throttle valve in a carburetor and a flow regulating valve provided in said secondary intake air supplying passage; the improvement comprising the steps of:
    detecting an intake air temperature and an engine temperature at starting of said engine; and
    controlling an opening degree of said flow regulating valve in accordance with both of the detected intake air temperature and the detected engine temperature when the detected intake air temperature is high and the detected engine temperature is high at starting of said engine.

4. The air-fuel ratio control method as defined in claim 3, wherein when the detected intake air temperature is high and the detected engine temperature is high at starting of said engine, the opening degree of said flow regulating valve is controlled to an opening degree according to both of the detected intake air temperature and the detected engine temperature, and until a condition that an engine speed greater than a cranking speed continues for a set time period and the opening degree of said flow regulating valve is gradually decreased after said condition has continued for said set time period.

5. The air-fuel ratio control method as defined in claim 4, wherein said set time is determined in accordance with the detected engine temperature at starting of said engine.

6. In an air-fuel ratio control method for an internal combustion engine having a secondary intake air supplying passage communicating with an intake pipe downstream of a throttle valve in a carburetor of a suction system, an exhaust gas component concentration sensor provided in an exhaust system for detecting an exhaust gas component concentration in an exhaust gas, a flow regulating valve provided in said secondary intake air supplying passage, and control means for controlling an opening degree of said flow regulating valve according to an output signal from said exhaust gas component concentration sensor under at least one predetermined operational condition; the improvement comprising the steps of:
    detecting an engine temperature at starting of said engine; and
    continuing to open said flow regulating valve irrespective of the output signal from said exhaust gas component concentration sensor when said engine is in a hot condition where the detected engine temperature is greater than a predetermined temperature, until said predetermined operational conditions are satisfied.

7. The air-fuel ratio control method as defined in claim 6, wherein the opening degree of said flow regulating valve is controlled to a controlled opening degree corresponding to the detected engine temperature at starting of said engine, and until a control time corresponding to the detected engine temperature from the completion of the engine starting operation is elapsed, while after said control time is elapsed from the completion of the engine starting operation, the opening degree of said flow regulating valve is kept at an opening degree irrespective of the detected engine temperature.

8. The air-fuel ratio control method as defined in claim 7, wherein the opening degree of said flow regulating valve is kept at an opening degree corresponding to an engine load after said control time from the completion of the engine starting operation is elapsed.

9. The air-fuel ratio control method as defined in claim 7, wherein the opening degree of said flow regulating valve is maintained at a predetermined opening after said control time from the completion of the engine starting operation is elapsed.

* * * * *